Patented Feb. 23, 1932

1,846,589

UNITED STATES PATENT OFFICE

ANNIE DUGAN, OF CHICAGO, ILLINOIS; ANNIE E. WEINFELD, EXECUTRIX OF SAID ANNIE DUGAN, DECEASED, ASSIGNOR TO HERSELF AS TRUSTEE

COMPOSITION FOR PATCHING AND SETTING STONES

No Drawing.  Application filed June 28, 1930.  Serial No. 464,713.

This invention relates to compositions for patching and setting stones, the object being to produce a compound which is readily and easily applied in filling surface cavities and when thoroughly dried and set closely resembles the stone so that the presence of the patch is not appreciable, the composition having substantially the same characteristics and durability of the stone itself and being ideal for use as a cement in setting stones in monumental work and building structures. Other particular objects and advantages to be attained will hereinafter more fully appear.

In the production of the composition it is preferable to use oolitic limestone, and more particularly such as found in certain quarries in the State of Indiana and more commonly known commercially as Bedford stone. This particular stone is of proven strength and durability, and is characteristically ideal as a base for the compound of the present invention. In the process of making the composition the stone which is shattered in the quarrying operations so as to be unsuitable for building purposes, and the relatively small pieces and chips resulting from the dressing of the stone are utilized to advantage, thereby making a valuable output for material which would otherwise be classed as waste or usable for road building and the like. The stone is first crushed and reduced to relatively small pieces of approximately uniform size. It is then placed in a kiln or furnace and subjected to intense heat for a period of time until the particles of stone are thoroughly decarbonated and crumbled into a power. This residue is then cooled and sifted, the refined residue thereafter being thoroughly mixed with a high grade commercial Portland or hydraulic cement together with calcined gypsum, or what is commercially known as plaster of Paris. This mixture is preferably produced in the following proportions:

592 pounds of the prepared Bedford stone;
376 pounds cement; and
350 pounds plaster of Paris.

The above ingredients, in the proportions noted, are thoroughly mixed in the dry state with the addition of certain coloring matter to give the product the desired tint corresponding to the color of the stone to be patched or set in the monumental or building structure. For example, for patching or setting the grayish colored stone, about two pounds of yellow ocher is added to the above mixture, for without the added coloring ingredient the product is practically white or light buff in color. Obviously, where the composition is to be used for patching or in conjunction with stones of other colors as, for instance, blue Indiana or red Portage sandstone, Japanese blue or vermilion red may be respectively employed in suitable quantities to produce the desired tint in the composition.

The composition produced in accordance with the present invention closely resembles the characteristic stone to which it is applied, is easily applied when mixed with water to produce a plastic mass of the proper consistency for troweling, sets readily after application, and after it is dried and set may be chiseled and smoothed in the same manner as the stone itself so as to conform to the surface contour of the stone.

The composition of the present invention may be manufactured and distributed at a low cost and is of high efficiency in that in its prepared plastic state it adheres with great tenacity to the stone to which it is applied and is capable of withstanding physical wear and the action of the elements substantially as well as the stone itself.

The product, as above noted, is manufactured in the dry state and distributed commercially in the same condition, it being only necessary to place the mixture in a plastic condition by the mere addition of water at the time of use, and while the ingredients are, for practical purposes, employed in the mixture in substantially the proportions herein specified, it is obvious that the proportions may be varied to some degree without in the least departing from the spirit and scope of the invention as defined by the appended claims. The invention, therefore, is not limited to the specific proportions of the ingredients herein stated.

Having thus described my invention, what I claim as new and desire to secure by Letters Patent is:

1. The herein described composition of matter comprising substantially 45 per cent of calcined Bedford stone, 28 per cent of Portland cement, and 27 per cent of plaster of Paris.

2. The herein described composition of matter comprising a dry mixture consisting of 592 pounds of calcined Bedford stone, 376 pounds of hydraulic cement, and 350 pounds of plaster of Paris.

3. The herein described composition of matter comprising 592 pounds of calcined Bedford stone, 376 pounds of hydraulic cement, 350 pounds of plaster of Paris, and 2 pounds of a coloring ingredient.

In testimony whereof I have signed my name to this specification.

Mrs. ANNIE DUGAN.